United States Patent [19]

Sailas

[11] 4,104,772
[45] Aug. 8, 1978

[54] STRIP-COVERED ROLL AND METHOD FOR MANUFACTURING THE SAME

[75] Inventor: Väinö Sailas, Vaajakoski, Finland

[73] Assignee: Valmet Oy, Helsinki, Finland

[21] Appl. No.: 796,193

[22] Filed: May 12, 1977

[30] Foreign Application Priority Data

May 17, 1976 [FI] Finland .................................. 761390

[51] Int. Cl.² ............................................. B30B 3/00
[52] U.S. Cl. ..................................... 29/121.4; 29/127
[58] Field of Search ..................... 29/121.4, 127, 125, 29/130, 110

[56] References Cited

U.S. PATENT DOCUMENTS

| | | | |
|---|---|---|---|
| 1,271,194 | 7/1918 | Meyer | 29/127 X |
| 2,186,890 | 1/1940 | Wilkie | 29/125 |
| 2,464,040 | 3/1949 | Huebner | 29/127 X |
| 3,007,231 | 11/1961 | Garver | 29/121.4 X |
| 3,156,968 | 11/1964 | White | 29/127 X |
| 4,037,299 | 7/1977 | Smith | 29/130 |

*Primary Examiner*—Alfred R. Guest
*Attorney, Agent, or Firm*—Steinberg & Blake

[57] ABSTRACT

A roll of the type which is used in a paper machine has an inner roll body covered with a plurality of strips. The strips include pairs of strip portions situated one next to the other along the roll body and covering the outer surface thereof. Each pair of strip portions extends through 360° around the roll body with each pair of strip portions including one strip portion at least part of which circumferentially surrounds and overlaps at least part of the other of each pair of strip portions. This one of each pair of strip portions circumferentially presses radially inwardly against at least said part of the other of each pair of strip portions to press the other of each pair of strip portions against the outer surface of the roll body. The one of each pair of strip portions has a coefficient of thermal expansion greater than the other of each pair of strip portions and when initially placed on the roll body is in a heated condition at a temperature sufficiently high so that upon cooling the one of each pair of strip portions will contract against the other of each pair of strip portions to provide the circumferential inwardly directed radial pressure acting to press the other of each pair of strip portions against the outer surface of the inner roll body.

10 Claims, 5 Drawing Figures

STRIP-COVERED ROLL AND METHOD FOR MANUFACTURING THE SAME

BACKGROUND OF THE INVENTION

The present invention relates to strip-covered rolls of the type used in paper machines, such rolls being provided at their exterior either with a grooved or with an ungrooved surface. These strips may be helically wound on the roll body which may consist of a solid roll body or which may be in the form of a hollow sleeve.

In connection with the use of rolls of this type in paper machines, the roll covering is preferably made of a corrosion-resistant material and the construction of the strips is such that the outer surface of the roll may be either grooved or ungrooved with convolutions of the strip being situated directly next to each other while distributed axially along the roll.

Paper machine roll coverings manufactured by winding a single covering strip onto an inner roll body are known. In this connection reference may be made to U.S. Pat. No. 3,718,959. In connection with the rolls of the above type, problems have been encountered in connection with reliably securing the strip to the roll in a manner which will prevent unwinding of the strip. Also, problems have been encountered in connection with providing between the strip and the surface of the roll body engaged thereby a seal which is tight enough to prevent corrosion of the inner roll body. Furthermore, different types of grooves are required for different types of rolls, and conventional constructions are relatively limited in connection with the nature of the grooves which can be provided.

SUMMARY OF THE INVENTION

It is accordingly a primary object of the present invention to provide a strip-covered roll and method for manufacturing the same which will avoid the above drawbacks.

Thus, it is an object of the present invention to provide a strip-covered roll and method for manufacturing the same which will assure prevention of unwinding of the strip while also achieving the seal between the strip structure and roll which will prevent corrosion of the inner roll body.

In addition, it is an object of the present invention to provide a strip-covered roll and method for manufacturing the same which will enable a great variability to be achieved in connection with the types of grooves which can be provided for the roll.

In accordance with the invention the strip covering includes at least a pair of strips one of which circumferentially presses the other inwardly radially against the inner roll body. For this purpose it is preferred to provide this one strip with a coefficient of thermal expansion greater than the other strip so that shrinking of the one strip against the other strip can be provided to achieve the circumferentially inward pressing of the other strip against the roll body.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
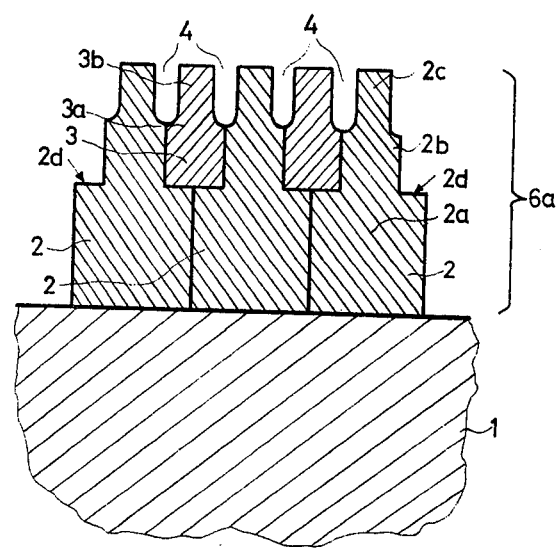
FIG. 1 is a schematic fragmentary section taken in a plane containing the axis of a roll body and showing on the roll body some of the convolutions of a pair of strips which are wound onto the roll body.
Figure 2:
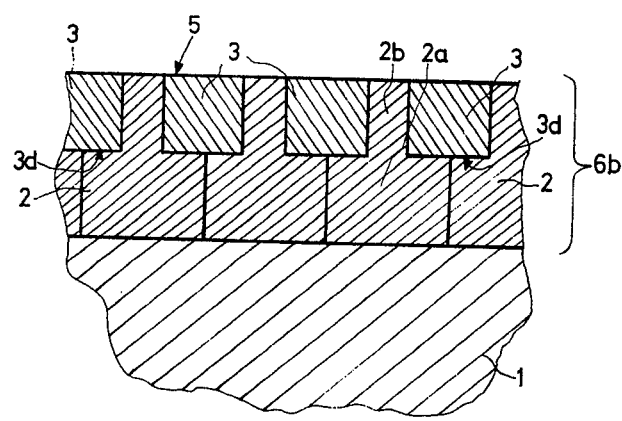
FIG. 2 is a fragmentary schematic sectional elevational also taken in a plane which contains the axis of the roll and showing another embodiment of strips which are helically wound onto an inner roll body.

Referring now to FIGS. 1 and 2, there is fragmentarily illustrated therein a roll body 1 which while shown as being solid can also take the form of a hollow sleeve. The outer surface of the roll body 1 is covered with at least a pair of strips 2 and 3 which are helically wound around the exterior surface of the roll body 1. The configuration of the strips 2 and 3 is such that these strips cooperate together and fit each other in the manner shown in FIGS. 1 and 2. In the event that the inner roll body 1 takes the form of a sleeve, this sleeve may be subsequently mounted on a roll body as a separate step.

In the example illustrated in FIGS. 1 and 2, the strips 2 and 3 respectively have pairs of strip portions which are situated one next to the other axially along the roll body 1 with each pair of strip portions extending through 360° circumferentially around the roll body 1. Each circumferential strip portion of the strip 2 has an inner relatively thick section 2a directly engaging the exterior surface of the inner roll body 1, and it will be noted that these inner relatively thick sections of the sucessive strip portions directly engage each other. These successive relatively thick strip portions 2a press tightly against each other at their side surfaces. Each relatively thick section 2a of each circumferential strip portion of the strip 2 has a thinner section 2b projecting radially and centrally from its relatively thick section 2a, and this thinner section 2b of each strip portion of the strip 2 has in turn an even thinner section 2c projecting centrally and radially therefrom, in the case of FIG. 1. In FIG. 2 it will be seen that the circumferential strip portions of the strip 2 have only the thinner sections 2b projecting radially from the inner thicker sections 2a. Thus, these thinner sections of the circumferential strip portions of the helically wound strip 2 define between themselves a groove which extends helically around the roll body 1. The outer strip 3 is situated in this helical groove and has in the embodiment of FIG. 1 an inner relatively thick section 3a situated between and engaging the relatively thin sections 2b of the several circumferential portions of the strip 2. Thus, in FIG. 1, the outer strip 3 has its inner relatively thick section 3a fitting tightly into the groove defined between the sections 2b of the convolutions of the strip 2. The relatively thin sections 2b define with the relatively thick section 2a of each circumferential strip portion of the strip 2 a pair of shoulders 2d, and each pair of adjoining shoulders 2d are engaged by the inner surface of the relatively thick section 3a of the convolutions of the strip 3.

In the embodiment of FIG. 1, the strips 2 and 3 form for the roll body 1 the covering 6a which is grooved at its exterior. Thus it will be seen that the thinnest outer portions 2c of the convolutions of the strip 2 are spaced from the thinner outer portions 3b of the strip 3, so that these outer portions 3b and 2c define between themselves the helical groove 4 extending along the covering 6a at the exterior thereof.

Of course, the grooves 4 or the equivalent thereof may be provided in other ways. For example, narrower grooves 4 will result if the strip 3 has a constant thickness, or similar narrow grooves 4 may be provided by providing the portions 2c of the strip 2 with the same thickness as the portion 2b thereof. Thus it is possible to achieve grooves of a desired size by providing only one of the strips with a suitable profile. Moreover, it is possible to form the desired groove structure simply by forming such a groove at an outer region of one of the strips between the opposed side surfaces thereof, so that with such a construction it is not required to provide one of the strips with a thinner outer portion in order to achieve the desired groove between the pair of strips. The configuration of the grooves 4 also may be selected as desired in accordance with an appropriate profile for one or the other or both of the strips.

As is apparent from FIG. 2, it is also possible to provide a structure of the invention according to which the covering 6b is ungrooved. Thus, in the case of the covering 6b of FIG. 2, the several circumferential portions of the strip 2 only have the thinner portions 2b projecting from the thicker portions 2a which directly engage each other, and the entire space between the thinner portions 2b is filled by the strip 3 which is of a constant cross section which is substantially square as illustrated in the example of FIG. 2. In this way the roll may be provided with a smooth continuous exterior surface 5 inasmuch as the outer surface of the strip 3 is of the same diameter as and forms a continuation of the outer surface of the strip 2.

The strips 2 and 3 may be wound onto the roll body 1 so as to cover the exterior surface thereof in the manner shown in FIGS. 1 and 2 and described above. These strips may be wound onto the roll body 1 either in a single step, where the strips are simultaneously wound onto the roll body 1, or the winding of the strips may be carried out in two separate operations. In this latter event the strip 2 will of course be the first to be wound onto the roll body 1 and thereafter the strip 3 will be wound onto the strip 2.

Figure 5:
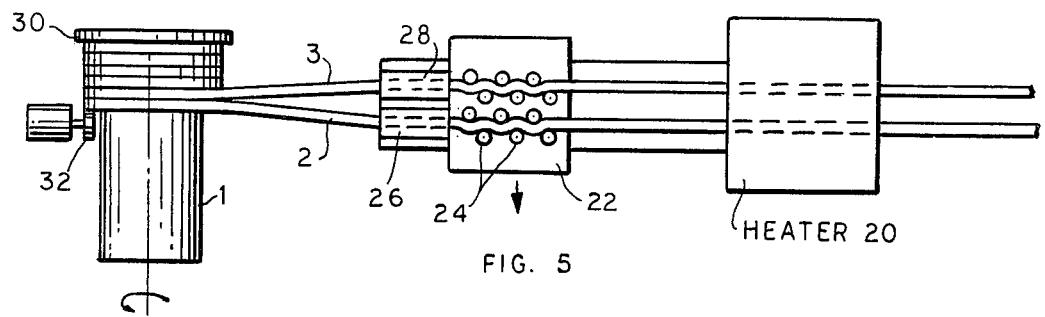
FIG. 5 is a schematic illustration of the method of the invention for winding a pair of strips onto a roll body.

As an example of how it is possible to wind the strips 2 and 3 onto the roll body 1, there is schematically illustrated in FIG. 5 an arrangement where the roll body 1 is mounted on a machine such as a suitable lathe, and in such a machine the roll body 1 will be rotated about its axis in the manner indicated in FIG. 5. The strips 2 and 3 are derived from any suitable supply rolls on which these strips are initially wound, for example, and they are guided through a heater 20 in which the strips are heated so as to assume a predetermined temperature for a reason pointed out below. The heater 20 may be an electric heater or any other suitable type of oven or the like through which the strips 2 and 3 travel while being heated to a desired temperature. The heating unit 20 is connected with a carriage 22 which moves parallel to the axis of the roll body 1 at a predetermined rate in a manner which is well known in machines such as lathes. The carriage 22 carries straightening rolls 24 through which the pair of strips 2 and 3 pass as illustrated toward the left in FIG. 5. Beyond the straightening rolls the carriage 22 carries a pair of brakes 26 and 28 through which the strips 2 and 3 respectively travel. These brakes 26 and 28 are in the form of tubular passages the interior cross section of which corresponds to the cross section of the strips 2 and 3, these passages having on one side a plate which can be adjusted so as to press against the strip travelling through the passage with a predetermined frictional force, thus requiring the roll body 1 to be turned in such a way as to tension the strips while pulling them through the brakes 26 and 28. Thus it is possible to adjust the tension with which the strips are applied to the roll body 1 during winding of the strips onto the roll body 1. The roll body 1 has at one end a ring 30 which is fixed to the roll body 1 and to which the ends of the strips 2 and 3 are initially fixed, so that thereafter upon turning of the roll body 1 the strips will be pulled through the structure shown in FIG. 5. A plurality of pressure rolls 32 are provided for pressing the wound strips axially toward the fixed ring 30 in the manner shown schematically in FIG. 5. These rolls 32 are connected with the carriage 22 in a suitable manner so as to move therewith. Thus, in the example shown in FIG. 5 the pair of strips 2 and 3 come together as they are wound onto the roll body 1 so as form in this way a structure as shown either in FIG. 1 or in FIG. 2.

According to a preferred embodiment of the invention the materials selected for the strips 2 and 3 are such that the strip 2 has a smaller coefficient of thermal expansion than the strip 3. Thus when the strip 2 is wound in a heated condition around the roll body 1, in the manner described above in connection with FIG. 5 and to provide a construction as illustrated in FIGS. 1 or 2, the strip 2 upon cooling will of course shrink and tightly grip the roll body 1 so that it becomes attached with a pressure fit to the roll body 1. The strip 3 which is wound either simultaneously with or subsequent to the strip 2 is also in a heated condition when wound around the strip 2 in the manner indicated in FIGS. 1 or 2, and this strip 3 also will shrink upon cooling so that it will circumferentially grip the strip 2 and press the latter radially inwardly toward the roll body 1, so that in this way the covering is firmly fixed in position on the roll body 1. The shrink joint of the strips 2 and 3 on the roll body 1 as described above may also be utilized in connection with coverings which are made not of continuous profile strips which are wound onto the roll body 1 but which instead are made of continuous closed rings which are situated one after the other on the roll body 1, being slipped onto the latter from one end thereof in a heated condition and then shrinking so as to provide the tight gripping as set forth above. Thus, the various convolutions of the strips 2 and 3 shown in FIGS. 1 and 2 also may be considered as separate circular endless rings.

Figure 3:
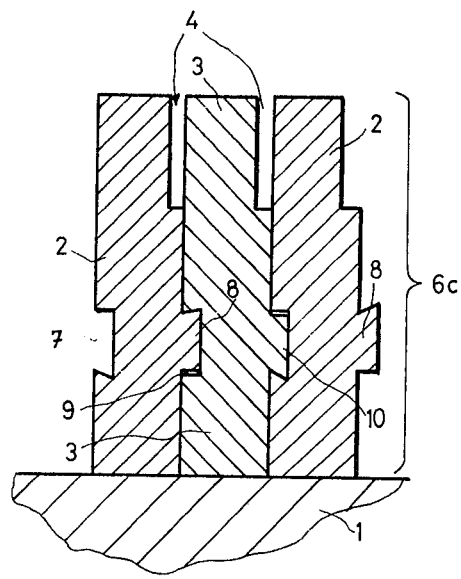
FIG. 3 is a fragmentary schematic sectional elevation, taken in a plane containing the axis of the roll, and illustrating a third embodiment of a structure according to the invention.

In the embodiment of the invention which is illustrated in FIG. 3, the roll body 1 is provided with a strip covering 6c also made up of a pair of strips 2 and 3 with the strip 3 having a greater coefficient of thermal expansion than the strip 2. However, in this case the portions of the strips 2 and 3 which extend circumferentially around the body 1 through 360° are situated one next to the other in engagement with the body 1, in contrast with the arrangement shown in FIGS. 1 and 2. With the embodiment of FIG. 3 the side surfaces of the strips are formed with projections and grooves as illustrated. Thus, the strip 2 is formed in one of its side surfaces with the groove 7 extending longitudinally along the strip 2 throughout the entire length thereof while at its opposite side surface the strip 2 has a projection 8 also extending longitudinally along the strip 2 throughout its entire length. The strip 3 is formed at its left surface with a corresponding groove 9 and at its right surface with a projection 10, as illustrated in FIG. 3. Thus, the surfaces of the strips 2 and 3 which respectively engage each other are respectively formed with a groove and a projection received in this groove so as to provide the interlocking of the strips 2 and 3 in this manner. In the arrangement shown in FIG. 3, the cooperating groove 7 and projection 10 have a dovetail configuration along their inner side edge regions whereas the cooperating groove 9 and projection 8 have a dovetail configuration along their outer side edge regions. Thus, an asymmetric arrangement is provided in that the dovetail locking parts of the groove 7 and projection 10 are situated at a side region thereof opposite from the side region of the groove 9 and projection 8 where the latter have the dovetail cooperation.

Figure 4:
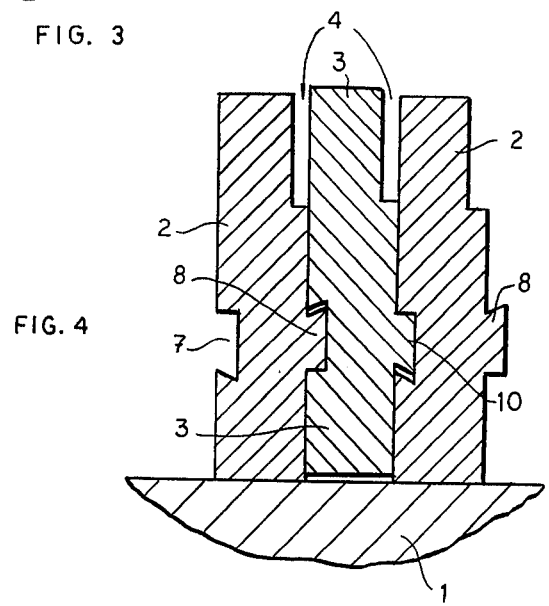
FIG. 4 shows the structure of FIG. 3 in the condition it has when the strips are initially wound onto the inner roll body.

The manner in which the construction shown in FIG. 3 is achieved is illustrated in FIG. 4. These strips 2 and 3 of FIG. 3 are wound onto the roll body 1 in the manner shown schematically in FIG. 5 so that the strips 2 and 3 initially are in a heated condition. When these strips 2 and 3 of FIG. 3 are fed to the rotating body 1, the tension provided by the brake 26 on the strip 2 is greater than that provided by the brake 28 on the strip 3, so that the strip 2 is wound directly against the exterior surface of the body 1 whereas the strip 3 will initially be spaced slightly from the exterior surface of the body 1, as indicated in FIG. 4. As these strips 2 and 3 are fed to the roll body 1, the projection 8 can move freely into the groove 9, as is apparent from FIG. 4, and in the same way the projection 10 can move into the groove 7. The braking action of the brake 28 on the strip 3 is such that there remains in the strip 3 a sufficient springy force to tend to urge the strip 3 outwardly away from the roll body 1, so that the strip 3 at the inner surface of its groove 9 presses outwardly against the inner surface of the projection 8, and in the same way the projection 10 presses at its outer surface against the outer surface of the groove 7. Thus it will be seen that in FIG. 4 there is between the projection 8 and the groove 9 an outer gap and between the projection 10 and the groove 7 an inner gap.

As the strips 2 and 3 in the condition shown in FIG. 4 cool, they will of course shrink and the strip 2 will tightly engage the roll body 1 as described above. The strip 3 has the greater coefficient of thermal expansion as pointed out above, and upon cooling the strip 3 will contract into pressing engagement with the exterior surface of the roll body 1 while also pressing in a radially inward direction against the projection 8 of the strip 2 and the inner surface of the groove 7 of the strip 2, to provide in this way the construction illustrated in FIG. 3 and described above.

In the particular embodiment which is shown in FIG. 3 the strips 2 and 3 are stepped at their right side surface, as viewed in FIG. 3, so as to provide in this way the grooves 4 illustrated in FIG. 3.

It is thus apparent that with the above-described structure and method of the invention the strips 2 and 3 will each have portions extending around the roll body 1 through 360°, and these portions of the strips 2 and 3 will form pairs of strip portions which are situated one after the other axially along the roll body 1. One of each pair of strip portions, namely the strip portions of the strip 3, at least in part circumferentially surrounds and overlaps at least part of the other of each pair of strip portions, the latter of course being portions of the strip 2, and at the circumferential overlapping parts of the strip portions, that one of each pair of strip portions which in part circumferentially surrounds and overlaps at least part of the other of each pair of strip portions presses radially inwardly against this other of each pair of strip portions so as to press the latter inwardly into engagement with the exterior surface of the roll body 1.

The strips 2 and 3 are preferably made of nickelalloyed stainless steel. With such a material it is well known that the nickel content of the steel has the effect of determining the coefficient of thermal expansion. It is thus possible by suitably selecting the nickel content to achieve either a small or a large coefficient of thermal expansion. It is known that a minimum coefficient of thermal expansion may be obtained by utilizing an alloy containing on the order of 40% nickel, and it is this latter alloy which is preferred for the strip 2. For the strip 3 it is preferred to utilize a nickel-alloyed stainless steel having on the order of 10% nickel, so that for the strip 3 there will be provided a coefficient of thermal expansion which is considerably greater than that of the strip 2. It has been found from experience that with these particular materials the strip 3 will have a coefficient of thermal expansion which is sufficiently greater than that of the strip 2 in order to achieve the construction of the invention described above and shown in the drawings.

Of course, the invention is not to be narrowly confined to the features set forth above and shown in the drawings. Many details may vary considerably. Thus, for example, it is possible to utilize more than two strips, if necessary. Furthermore, the roll coverings may be manufactured in such a way that they are only partly grooved while they are also partly provided with an exterior smooth surface.

What is claimed is:

1. In a roll of the type which is used in a paper machine, an inner body and a plurality of strips circumferentially surrounding and covering an outer surface of said inner roll body, said strips including pairs of strip portions situated one next to the other axially along the roll body with each pair of strip portions extending through 360° around the roll body and with each pair of strip portions including one strip portion which at least in part circumferentially surrounds and overlaps at least part of the other of each pair of strip portions, said one of each pair of strip portions circumferentially pressing radially inwardly against at least said part of the other of each pair of strip portions and pressing at least said other of each pair of strip portions against the outer surface of said inner roll body.

2. The combination of claim 1 and wherein said one of each pair of strip portions has a coefficient of thermal expansion greater than the coefficient of thermal expansion of the other of each pair of strip portions.

3. The combination of claim 1 and wherein said other of each pair of strip portions has an inner relatively thick section directly engaging the outer surface of said inner roll body and also directly engaging the relatively thick inner sections of the other strip portions of the immediately preceding and immediately following pairs of strip portions, said other of each pair of strip portions having an outer relatively thin section projecting radially from said relatively thick section thereof and defining a circumferential shoulder therewith, said one of each pair of strip portions being spaced from said outer surface of said inner roll body and circumferentially engaging and pressing radially inwardly against said shoulder of said other of each pair of strip portions.

4. The combination of claim 3 and wherein said relatively thin section of said other of each pair of strip portions is centrally situated with respect to said relatively thick section thereof to define a pair of said shoulders on said other of each pair of strip portions, said shoulders of said pairs of strip portions being situated next to each other and forming an extension of each other at the region where the inner thicker sections of the other of each pair of strip portions engage each other, and said one of each pair of strip portions filling the space between the relatively thin sections of said other strip portions of pairs of adjoining strip portions so that said one of each pair of strip portions extends across the location where said other of each pair of strip portions engages the immediately preceding and immediately following other strip portions of each pair.

5. The combination of claim 4 and wherein all of said strip portions have outer circumferential surfaces of the same diameter all forming part of a continuous cylinder which surrounds the inner roll body.

6. The combination of claim 4 and wherein each pair of strip portions has an outer region formed with a free circumferential side surface extending inwardly from an outer surface of each pair of strip portions and being out of engagement with and spaced away from any other part of the strip portions to define a circumferential groove at the exterior of the strips.

7. The combination of claim 1 and wherein the strip portions of each pair of strip portions are situated one next to the other axially along the inner roll body with both of said strip portions of each pair directly engaging the outer surface of said roll body, said strip portions of each pair respectively having side surfaces engaging each other and one of said side surfaces being formed with a groove while the other of said side surfaces has a projection extending into said groove and said one strip portion of each pair circumferentially pressing radially against the other strip portion of each pair at said projection and groove of each pair of strip portions.

8. The combination of claim 7 and wherein said projection and groove have along at least one side edge a dovetail configuration for interlocking the strip portions of each pair.

9. The combination of claim 2 and wherein said strip portions are made of nickel-alloyed stainless steel respectively having different amounts of nickel for providing for said one of each pair of strip portions a greater thermal expansion coefficient than the other of each pair of strip portions.

10. The combination of claim 9 and wherein said one of each pair of strip portions has on the order of a 10% nickel content while the other of each pair of strip portions has on the order of a 40% nickel content to provide for said one of each pair of strip portions a coefficient of thermal expansion greater than that of said other of each pair of strip portions.

* * * * *